(12) United States Patent
Gehlhoff

(10) Patent No.: US 7,516,757 B2
(45) Date of Patent: Apr. 14, 2009

(54) POWER BEYOND STEERING SYSTEM

(75) Inventor: Wade L. Gehlhoff, Shakopee, MN (US)

(73) Assignee: Eaton Corporation, Cleveland, OH (US)

( * ) Notice: Subject to any disclaimer, the term of this patent is extended or adjusted under 35 U.S.C. 154(b) by 565 days.

(21) Appl. No.: 11/394,879

(22) Filed: Mar. 31, 2006

(65) Prior Publication Data
US 2007/0227599 A1   Oct. 4, 2007

(51) Int. Cl.
*B62D 1/22* (2006.01)
*B62D 5/097* (2006.01)
*F15B 11/16* (2006.01)

(52) U.S. Cl. ................ 137/625.24; 60/384; 91/427

(58) Field of Classification Search ............ 137/625.21, 137/625.23, 625.24; 60/384, 387, 403; 91/427
See application file for complete search history.

(56) References Cited

U.S. PATENT DOCUMENTS

| | | | |
|---|---|---|---|
| 3,960,234 A | | 6/1976 | Morgan |
| 4,144,712 A | * | 3/1979 | Termansen ................ 60/384 |
| 4,159,723 A | * | 7/1979 | Baatrup et al. ............... 60/384 |
| 5,101,860 A | * | 4/1992 | Stephenson ............ 137/625.24 |
| 5,634,495 A | * | 6/1997 | Rasmussen et al. ..... 137/625.24 |
| 5,799,694 A | * | 9/1998 | Uppal ................... 137/625.24 |
| 5,927,072 A | * | 7/1999 | Vannette ..................... 60/452 |
| 6,076,349 A | * | 6/2000 | Stephenson et al. ........... 60/384 |
| 6,769,451 B2 | | 8/2004 | Hjelsand |
| 7,124,579 B1 | * | 10/2006 | Gehlhoff ..................... 60/469 |

* cited by examiner

*Primary Examiner*—John Rivell
(74) *Attorney, Agent, or Firm*—Sonu N. Weaver

(57) ABSTRACT

A fluid controller (15*a*) in a multiple-input hydrostatic power steering system includes a check valve assembly (101), having a first fluid passage (111), defining a check valve seat (105) and a check valve (103) operably associated therewith, in fluid communication with a second fluid passage (109), with the second fluid passage (109) being in fluid communication with a return port (25*a*). In the left (L) and right (R) operating positions, return flow can flow from the interior region (114) of the valve (27), through the first fluid passage (111), past the check valve (103), and through the second fluid passage (109) to the return port (25*a*). In the neutral position (N), pressurized fluid can flow from an inlet port (19*a*) to the return port (25*a*), with the check valve (103) preventing fluid from flowing through the first fluid passage (111) and into the interior region (114) of the valve (27).

9 Claims, 5 Drawing Sheets

POWER BEYOND STEERING SYSTEM

BACKGROUND OF THE DISCLOSURE

The present invention relates generally to hydrostatic power steering systems, and more particularly, to such hydrostatic power steering systems in which multiple fluid controllers are used to control the flow of fluid from a source of pressurized fluid to a fluid pressure actuated device, such as a steering cylinder.

A typical prior art hydrostatic power steering system includes a fluid reservoir, a fluid pressure source (such as a power steering pump), a single fluid controller, and a fluid pressure actuated device (such as a steering cylinder). The fluid controller used in such a steering system is typically a full fluid-linked steering controller. While this type of steering system is used in many hydraulic applications, it is limited to those hydraulic applications which require only one fluid controller location from which to control the fluid pressure actuated device.

Some applications, however, including but not limited to marine applications, require that the fluid pressure actuated device be controllable from multiple locations on a given application. Although a given application could include more than two locations from which to control the fluid pressure actuated device, the present invention will be described, for ease of description, in regard to applications requiring only two locations from which to control the fluid pressure actuated device, without intending to limit the present invention in any way. In order to accommodate this two-location requirement, a multiple-input (i.e., two or more steering wheels) hydrostatic power steering system is typically used. The typical prior art multiple-input hydrostatic power steering system used in such applications includes a fluid reservoir, a fluid pressure source (such as a power steering pump), two fluid controllers, and a fluid pressure actuated device.

Typically, in applications using a multiple-input hydrostatic power steering system, the fluid controller used in the first location is a "power beyond" fluid controller. In addition to an inlet port, a return port, and a pair of control fluid ports, a typical power beyond fluid controller also includes an additional fluid port through which inlet fluid is diverted when the fluid controller is in the neutral position. This diverted inlet fluid then flows through fluid connectors and fluid hoses to the inlet port of a second fluid controller, disposed in the second location on the application. The second fluid controller used in the second location is usually of the open-center type. While such a steering system allows for multiple location controllability of a fluid pressure actuated device, the cost of such a system becomes prohibitive in some applications. Two areas of the typical multiple-input hydrostatic power steering system which account for significant cost premiums are the additional fluid connectors and hoses needed to divert inlet fluid from the first fluid controller to the second fluid controller and the use of two substantially different fluid controllers in the first and second locations.

In order to reduce the cost of the previously described steering system, some applications have replaced the power beyond fluid controller with an open center fluid controller which diverts inlet fluid through the internal cavity (also referred to as "case") and return port of the fluid controller to the fluid inlet of the fluid controller in the second location. While the described steering system does allow for multiple location controllability of a fluid pressure actuated device, the life of the shaft seal and the thrust bearings in the fluid controller in the first location is reduced due to the force exerted on those components from the pressurized inlet fluid which is diverted through the internal cavity of the fluid controller. Therefore, the use of an open center fluid controller in the first location is unacceptable in many applications as a result of such potential decreased life.

BRIEF SUMMARY OF THE INVENTION

Accordingly, it is an object of the present invention to provide an improved power beyond steering controller which overcomes the above discussed disadvantages of the prior art.

It is a further object of the present invention to provide an improved power beyond steering system which overcomes the above discussed disadvantages of the prior art.

It is a more specific object of the present invention to provide an improved power beyond steering system that achieves a cost efficient steering system, while still providing multiple location controllability of a fluid pressure actuated device.

In order to accomplish the above mentioned objects, the present invention provides a fluid controller operable to control the flow of fluid from a source of pressurized fluid to a fluid pressure actuated device. The fluid controller includes a housing which defines an inlet port, a return port, and right and left control fluid ports. A valve means disposed in the housing defines a neutral position and left and right operating positions. The valve means cooperates with the housing to define a left main fluid path and a right main fluid path. In the neutral position, the valving provides fluid communication from the inlet port to the return port.

The fluid controller is characterized by the housing including a check valve assembly, having a first fluid passage in fluid communication with a second fluid passage and the second fluid passage being in fluid communication with said return port. The first fluid passage defines a check valve seat and a check valve operably associated therewith. In the left and right operating positions, return flow can flow from the interior region of the valve means, through the first fluid passage, past the check valve, and through the second fluid passage to the return port. In the neutral position, pressurized fluid can flow from the inlet port to the return port, while being prevented by the check valve from flowing through the first fluid passage and into the interior region of the valve means.

In order to further accomplish the objects mentioned above, the present invention also provides a multiple-input hydrostatic power steering system including a source of pressurized fluid, first and second full fluid-linked fluid controllers, and a fluid pressure actuated device. Each of the fluid controllers includes a housing defining an inlet fluid port for connection to a source of pressurized fluid, left and right control fluid ports for connection to the fluid pressure actuated device, and a return fluid port. A valve means disposed in the housing of the fluid controller defines a neutral position and left and right operating positions in which the valve means provides fluid communication from the inlet port to the left and right control fluid ports, respectively, defining left and right main fluid paths. In the neutral position, the valve means provides fluid communication from the inlet port to the return port.

The multiple-input hydrostatic power steering system is characterized by the first and second fluid controllers being substantially identical. Each of the first and second fluid controllers have both of the left and right main fluid paths flowing through an interior region of the valve means, then flowing through a first fluid passage defined by the housing and including a downstream portion in fluid communication with a second fluid passage defined by the housing and being in fluid communication with the return port. In addition, each of the first and second steering valves have the first fluid passage defining a valve seat and a check valve operably associated therewith, whereby, in the left and right operating positions, return fluid can flow from the interior region of the valve means, through the first fluid passage, past the check valve, and through the second fluid passage to the return port. In the neutral position, pressurized fluid can flow from the inlet port to the return port while being prevented by the check valve from flowing through the first fluid passage and into the interior region of the valve means.

DETAILED DESCRIPTION OF THE PREFERRED EMBODIMENT

Figure 1:
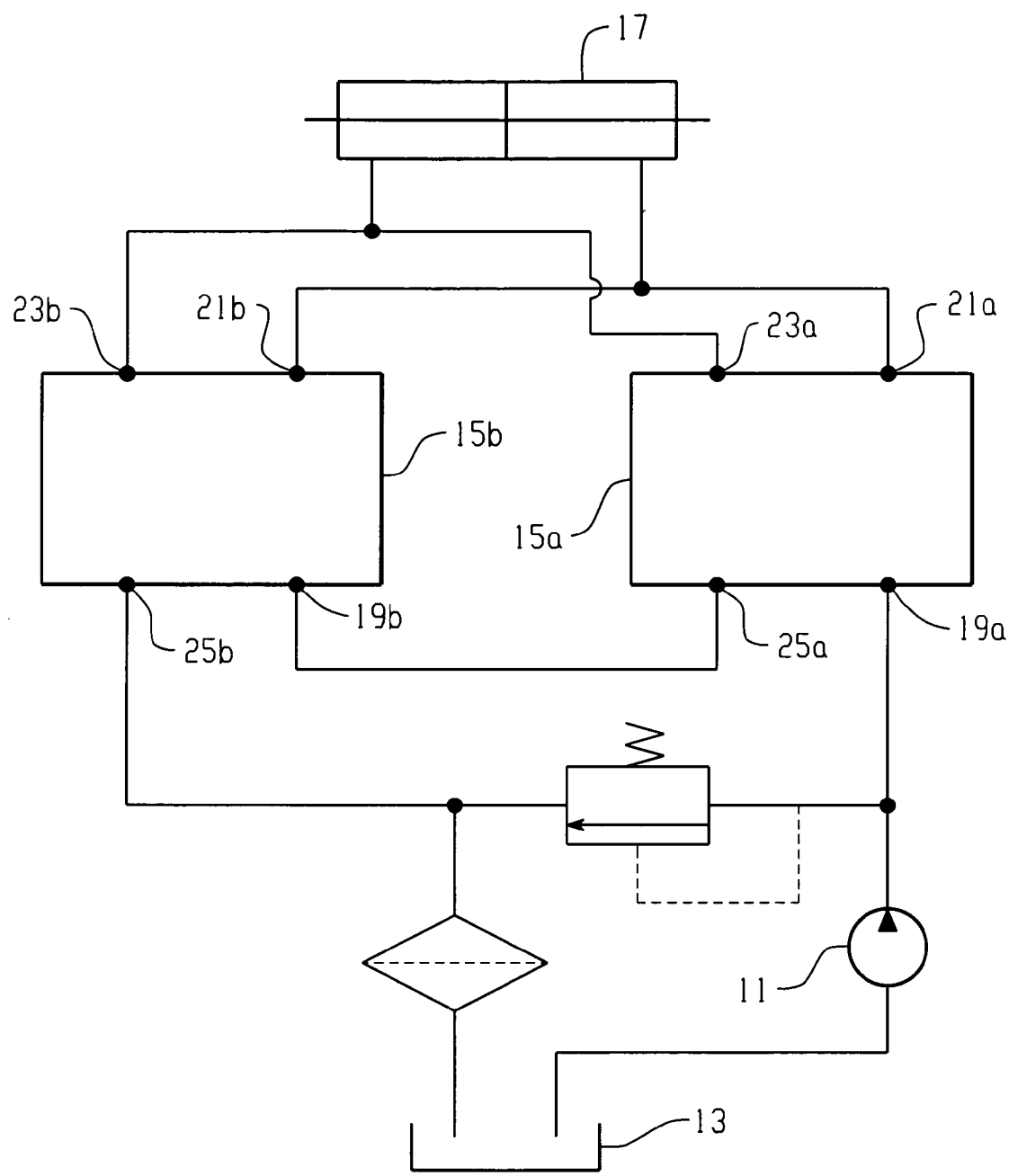
FIG. 1 is a hydraulic schematic of a multiple-input hydrostatic power steering system made in accordance with the present invention.

Referring now to the drawings, which are not intended to limit the invention, FIG. 1 is a hydraulic schematic of a multiple-input hydrostatic power steering system made in accordance with the teachings of the present invention. The system includes a fluid pump 11, shown herein as a fixed displacement pump, a system reservoir 13, a first fluid controller 15a, a second fluid controller 15b, and a steering cylinder 17.

The first fluid controller 15a includes an inlet port 19a, a left control fluid port 21a, a right control fluid port 23a, and a return fluid port 25a. The second fluid controller 15b similarly includes an inlet port 19b, a left control fluid port 21b, a right control fluid port 23b, and a return fluid port 25b. The inlet of the fluid pump 11 is connected to the system reservoir 13. The outlet of the pump 11 is communicated to the inlet port 19a of the first fluid controller 15a. The left and right control fluid ports 21a, 23a of the first fluid controller 15a are in fluid communication with opposite ends of the steering cylinder 17.

The return port 25a of the first fluid controller 15a is connected to the inlet port 19b of the second fluid controller 15b. The left and right control fluid ports 21b, 23b of the second fluid controller 15b are in fluid communication with opposite ends of the steering cylinder 17. The return port 25b of the second fluid controller 15b returns fluid to the system reservoir 13.

In this first embodiment, the first fluid controller 15a may be substantially identical to the second fluid controller 15b. Therefore, for ease of description, only the first fluid controller 15a will be described in detail.

Figure 2:
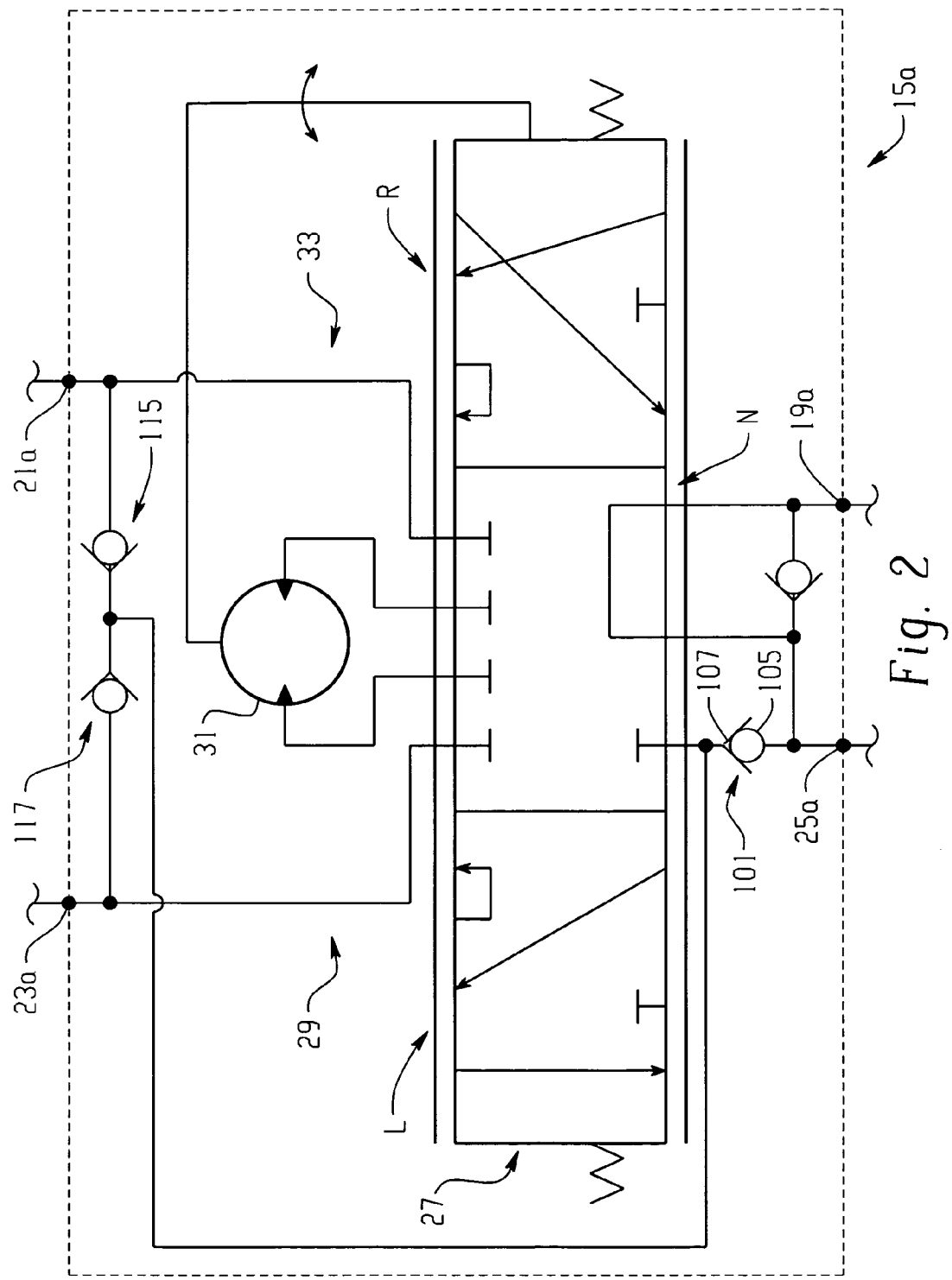
FIG. 2 is a hydraulic schematic of a first fluid controller in a multiple-input hydrostatic power steering system made in accordance with the present invention.

Referring now to FIG. 2, the first fluid controller 15a is shown schematically in greater detail than it is shown in FIG. 1. Disposed in the first fluid controller 15a is controller valving, generally designated 27, which is moveable from its neutral position N to either a right turn position R or a left turn position L. When the controller valving 27 is in the right turn position R, pressurized fluid is communicated along a right main fluid path, generally designated 29, from the pump 11 through the controller valving 27, and then through a fluid meter 31 which measures the proper amount of fluid to be communicated to one end of the steering cylinder 17. When the controller valving 27 is in the left turn position L, pressurized fluid is communicated along a left main fluid path, generally designated 33, from the pump 11 through the controller valving 27 and then through the fluid meter 31 to the opposite end of the steering cylinder 17. In addition to measuring the proper amount of fluid communicated to the steering cylinder (corresponding to the amount of steering input to the first fluid controller 15a), another function of the fluid meter 31 is to provide follow-up movement to the controller valving 27, such that the controller valving 27 is returned to its neutral position N after the desired amount of fluid has been communicated to the steering cylinder 17.

Figure 3:
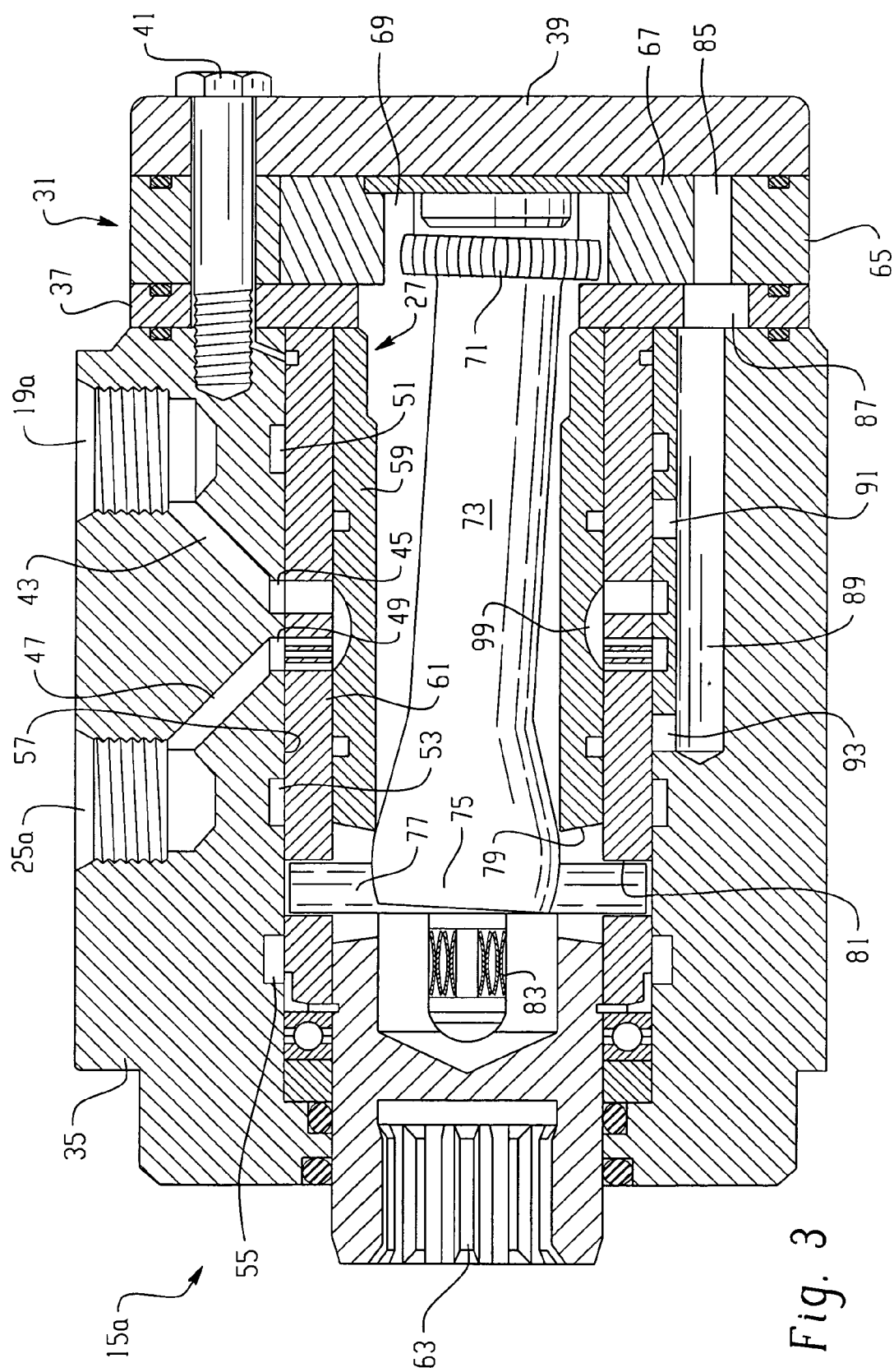
FIG. 3 is an axial cross section of a first fluid controller of the type which may embody the present invention.

Referring now to FIG. 3, the first fluid controller 15a comprises several sections, including a valve housing 35, a port plate 37, the fluid meter 31, and an end plate 39. The sections are held together in tight sealing engagement by means of a plurality of bolts 41, in threaded engagement with the valve housing 35.

The valve housing 35 defines a fluid inlet passage 43 communicating between the fluid inlet port 19a and a fluid inlet annular groove 45. The valve housing 35 also defines a fluid return passage 47 communicating between the fluid return port 25a and a fluid return annular groove 49. The valve housing 35 further defines an annular groove 51 communicating with the right fluid control port (not shown in FIG. 3), through a right fluid control passage (not shown), and an annular groove 53 communicating with the left fluid control port (not shown in FIG. 3), through a left fluid control passage (not shown). Also defined by the valve housing 35 is a cavity fluid return annular groove 55 which communicates with the fluid return port 25a in a manner which will be described in greater detail subsequently.

The valve housing 35 also defines a valve bore 57 in which is disposed the controller valving 27. In the subject embodiment, and by way of example only, the controller valving 27 includes a primary, rotatable member 59, also referred to hereinafter as a "spool", and a follow-up valve member 61, also referred to hereinafter as a "sleeve." At the forward end of the spool 59 is a portion having a reduced diameter and defining a set of internal splines 63 which provide for a direct mechanical connection between the spool 59 and an input device, such as a steering wheel (not shown).

The fluid meter 31 includes an internally toothed ring 65, and an externally toothed star 67. The star defines a set of internal splines 69, and in splined engagement therewith is a set of external splines 71 formed on the rearward end of a drive shaft 73. The drive shaft 73 has a bifurcated forward end 75 permitting driving connection between the drive shaft 73 and the sleeve 61, by means of a pin 77 passing through a pair of openings 79 in the spool 59 and a pair of openings 81 in the sleeve 61, in a manner now well know to those skilled in the controller art. Thus, pressurized fluid flowing through the controller valving 27 in response to rotation of the spool 59 flows through the fluid meter 31, causing orbital and rotational movement of the star 67 within the ring 65. Such movement of the star 67 causes follow-up movement of the sleeve 61, by means of the drive shaft 73 and pin 77 to maintain a particular relative displacement between the spool 59 and the sleeve 61, proportional to the rate of rotation of the input device. A plurality of leaf springs 83 extend through an opening in the spool 59, biasing the sleeve 61 toward the neutral position N relative to the spool 59.

Referring still to FIG. 3, the toothed interaction of the star 67, orbiting and rotating within the ring 65, defines a plurality of expanding and contracting fluid volume chambers 85, and adjacent each chamber 85, the port plate 37 defines a plurality of fluid ports 87. The valve housing defines a plurality of axial bores 89, each of which is in open fluid communication with one of the fluid ports 87, and therefore, with one of the volume chambers 85. The valve housing 35 further defines a pair of radial bores 91 and 93 which provide commutating fluid communication between each of the axial bores 89 and the valve bore 57.

Controller valving of a similar type, and the operation thereof, have been described in U.S. Pat. No. 6,769,451, assigned to the assignee of the present invention and incorporated herein by reference. Therefore, a detailed description of the controller valving 27 and operation thereof will not be provided herein.

Figure 4:
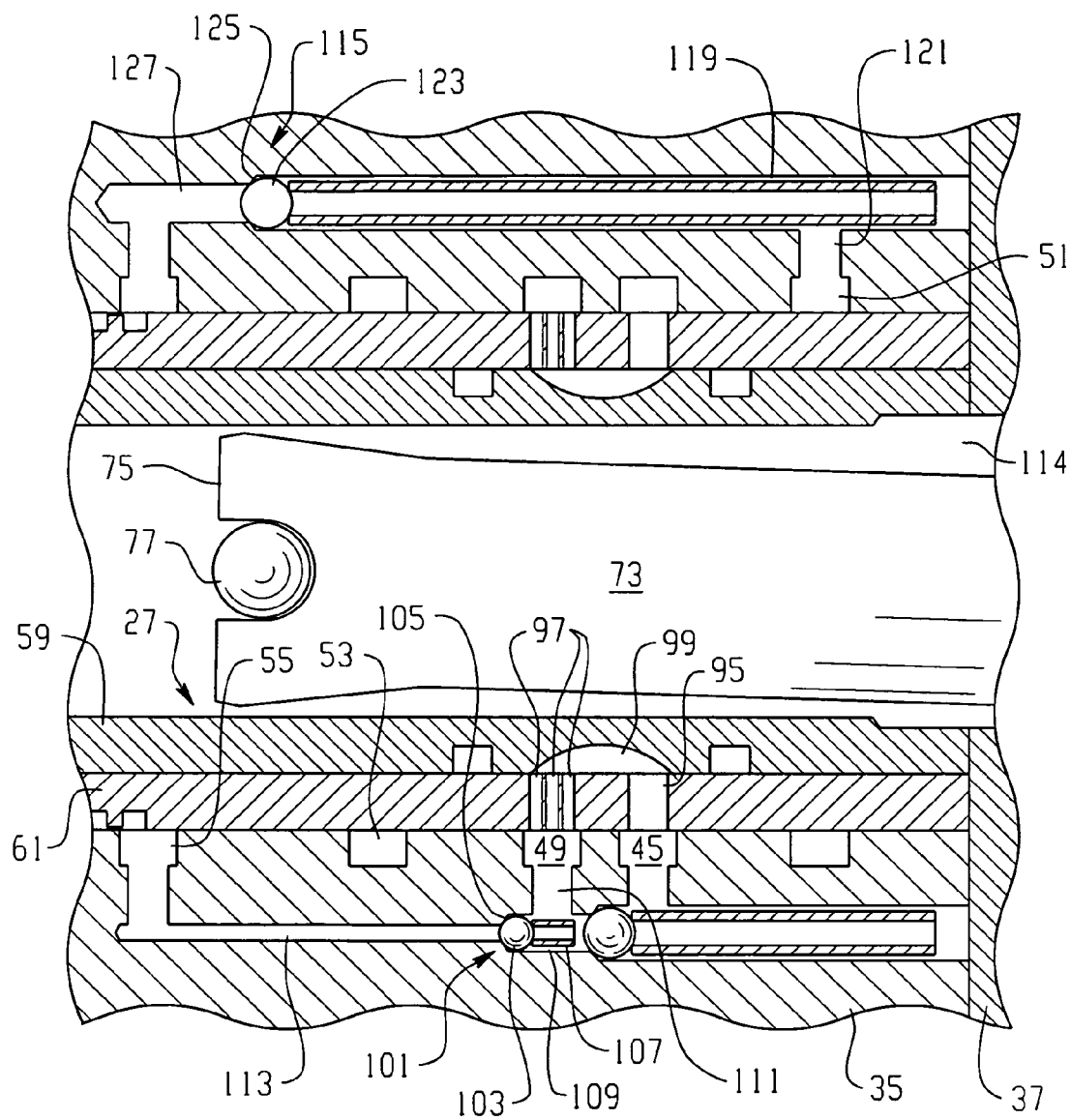
FIG. 4 is an enlarged, fragmentary, axial cross section, similar to FIG. 3, of a fluid controller, showing one aspect of the present invention.

Referring now primarily to FIG. 4 with references made to elements introduced in FIG. 3, the sleeve 61 defines a plurality of pressure ports 95 located circumferentially around the sleeve 61. The pressure ports 95 are axially located in the sleeve 61 such that the pressure ports 95 are in open fluid communication with the fluid inlet port 19a through the fluid inlet annular groove 45 in the valve housing 35. The sleeve 61 further defines a plurality of return fluid ports 97 located circumferentially around the sleeve 61. The return fluid ports are axially located in the sleeve 61 such that the return fluid ports 97 are in open fluid communication with the fluid return port 25a through the fluid return annular groove 49.

The spool 59 defines a plurality of fluid grooves 99 located circumferentially around the spool 59. The fluid grooves 99 are axially located in the spool 59 such that the fluid grooves 99 provide fluid communication between the pressure ports 95 and the return fluid ports 97 in the sleeve 61 when the controller valving 27 is in the neutral position N.

Referring still to FIG. 4, a check valve assembly, generally designated 101, is shown disposed in the valve housing 35. Although the check valve assembly 101 is shown disposed in the valve housing 35, it should be understood that the check valve assembly 101 could alternatively be disposed in the controller valving 27. As shown in FIG. 4, however, the check valve assembly 101 is disposed circumferentially between adjacent axial bores 89 in valve housing 35. The check valve assembly 101 includes a check valve 103, shown herein by way of example only as being in the form of a check ball, a check valve seat 105, and a retainer pin 107 disposed in a fluid cavity 109.

When the controller valving 27 in the first fluid controller 15a is in the neutral position N, pressurized inlet fluid enters into the first fluid controller 15a through the inlet port 19a and then flows to the fluid inlet annular groove 45 through the fluid inlet passage 43. The pressurized fluid then flows through the pressure ports 95 in the sleeve 61 to the fluid grooves 99 in the spool 59. As previously mentioned, the fluid grooves 99 in the spool 59 provide fluid communication between the pressure ports 95 and the return fluid ports 97 when the controller valving 27 is in the neutral position N. Therefore, in the neutral position N, the pressurized fluid then flows through the return fluid ports 97 in the sleeve 61 and to the fluid return annular groove 49. After flowing through the fluid return annular groove 49 of the first fluid controller 15a, the pressurized fluid enters the fluid cavity 109 through a fluid passage 111. In fluid cavity 109, the pressurized fluid acts against the check valve 103. The pressurized fluid forces the check valve 103 against the check valve seat 105, thereby substantially blocking fluid communication between the fluid cavity 109 and a return fluid passage 113 which is in open fluid communication with the cavity fluid return annular groove 55. Since the cavity fluid return annular groove 55 is also in open fluid communication with an interior region 114 of the controller valving 27, this blocking of fluid communication between the fluid cavity 109 and the cavity fluid return annular groove 55 ensures that the pressurized fluid in the fluid cavity 109 is not in open fluid communication with the interior region 114 of the controller valving 27. The problems associated with pressurized fluid in the interior region 114 of the controller valving 27 were discussed in the BACKGROUND OF THE DISCLOSURE.

From the fluid return annular groove 49, the pressurized fluid then flows through the fluid return passage 47 (see FIG. 3) to the fluid return port 25a where the pressurized fluid is communicated to the second fluid controller 15b. Therefore, with the first fluid controller 15a in the neutral position N, the second fluid controller 15b receives pressurized fluid at its fluid inlet port 19b, such that the second fluid controller 15b can now be used to control the steering cylinder 17, in the same manner as was previously done with the first fluid controller 15a.

While the check valve assembly 101 substantially blocks the fluid communication between the fluid cavity 109 and the cavity fluid return annular groove 55 when the controller valving is in the neutral position N, pressurized fluid in the fluid inlet annular groove 45 and the fluid return annular groove 49 may leak into the interior region 114 of the controller valving 27 through any clearances between the spool 59 and the sleeve 61. In order to relieve pressurized fluid in the interior region 114 of the controller valving 27 resulting from leakage from the fluid inlet annular groove 45 and the fluid return annular groove 49, a left control fluid check valve assembly, generally designated 115, and a right control fluid check valve assembly, generally designated 117 (not shown in FIG. 4 but shown schematically in FIG. 2), are used to provide "one-way" fluid communication between the cavity fluid return annular groove 55 and the annular groove 51 and the annular groove 53, respectively. For ease of illustration and description, FIG. 4 shows only the right control fluid check valve assembly 115 which provides one-way fluid communication between the cavity fluid return annular groove 55 and the annular groove 51. It should be understood, however, that the right control fluid check valve assembly 117 contains elements similar to those introduced with respect to the left control fluid check valve assembly 115.

When the controller valving 27 of the first fluid controller 15a is in the neutral position N and the controller valving 27 of the second fluid controller 15b is in the right turn position R, the left control fluid port 21b of the second fluid controller 15b is in open fluid communication with the reservoir 13. Since the left control fluid port 21b of the second fluid controller 15b is in open fluid communication with the left control fluid port 21a of the first fluid controller 15a (shown schematically in FIG. 1), the annular groove 51 of the first fluid controller 15a, which is in open fluid communication with the left control fluid port 21a, is also in open fluid communication with the reservoir 13. Therefore, when the second fluid controller 15b is in the right turn position R, the pressure of the fluid in the annular groove 51 is similar to system reservoir 13 pressure.

Referring still to FIG. 4, with the first fluid controller 15a in the neutral position N and the second fluid controller 15b in the right turn position R, fluid in the annular groove 51 enters a fluid cavity 119 through a fluid passage 121. The pressure of this fluid acts against a check valve 123 and forces the check valve 123 against a check valve seat 125. Thus, the check valve 123 blocks the fluid from the annular groove 51 from entering a fluid passage 127 which is in open fluid communication with the cavity fluid return annular groove 55. When the fluid pressure in the interior region 114 of the controller valving 27 reaches a value slightly greater than the pressure of the fluid in the annular groove 51, the check valve 123 will "lift off" and provide fluid communication between the cavity fluid return annular groove 55 and the annular groove 51 through the fluid cavity 119 and the return passage 121. The check valve 123 will remain unseated from the check valve seat 125 until the fluid pressure in the interior region 114 of the controller valving 27 is reduced to a value below the system reservoir 13 pressure.

If the controller valving 27 of the second fluid controller 15b is displaced in the left turn position L, the pressurized fluid in the interior region 114 of the controller valving 27 can still be maintained at system reservoir 13 pressure by a manner similar to that previously described. The only difference being that with the controller valving 27 of the second fluid controller 15b in the left turn position L, the pressurized fluid in the interior region 114 of the controller valving 27 is relieved through the right control fluid check valve assembly 117 instead of the left control fluid check valve assembly 115.

When the controller valving 27 of the first fluid controller 15a is displaced from the neutral position N to either the right turn position R or the left turn position L, the fluid grooves 99 in the spool 59 no longer provide direct fluid communication between the pressure ports 95 and the fluid return ports 97. With the controller valving 27 of the first fluid controller 15a in either the right or left turn position R, L, and the controller valving 27 of the second fluid controller 15b in the neutral position N, the pressure of the fluid in the fluid return annular groove 49 of the first fluid controller 15a is similar to the pressure of the fluid in the system reservoir 13. This fluid in the fluid return annular groove 49 acts against the check valve 103 and forces the check valve 103 against the check valve seat 105. When the fluid pressure in the interior region 114 of the controller valving 27 of the first fluid controller 15a reaches a value slightly greater than the pressure of the return fluid in the return fluid annular groove 49, the check valve 103 will "lift off" and provide fluid communication between the cavity fluid return annular groove 55 and the return fluid annular groove 49 through the return fluid passage 111 and the fluid cavity 109.

The subject embodiment is shown with the retainer pin 107 in the fluid cavity 109 and a retainer pin 129 in the fluid cavity 119. The size of the retainer pins 107, 129 is such that the retainer pins 107, 129 fit loosely within the respective fluid cavities 109, 119. As a result of this loose fit, the retainer pins 107, 129 can move axially within the respective fluid cavities 109, 119. However, while the retainer pins 107, 129 can move axially within the respective fluid cavities 109, 119, the retainer pins 107, 129 function to keep the respective check valves 103, 123 from moving beyond the centerline of the respective fluid passages 111, 121 toward the end of the fluid cavities 109, 119 opposite the respective check valve seats 105, 125. This movement restriction of the check valves 103, 123 prevents the fluid pressure from forcing the check valves 103, 123 to the opposite end of the respective fluid cavities 109, 119.

Figure 5:
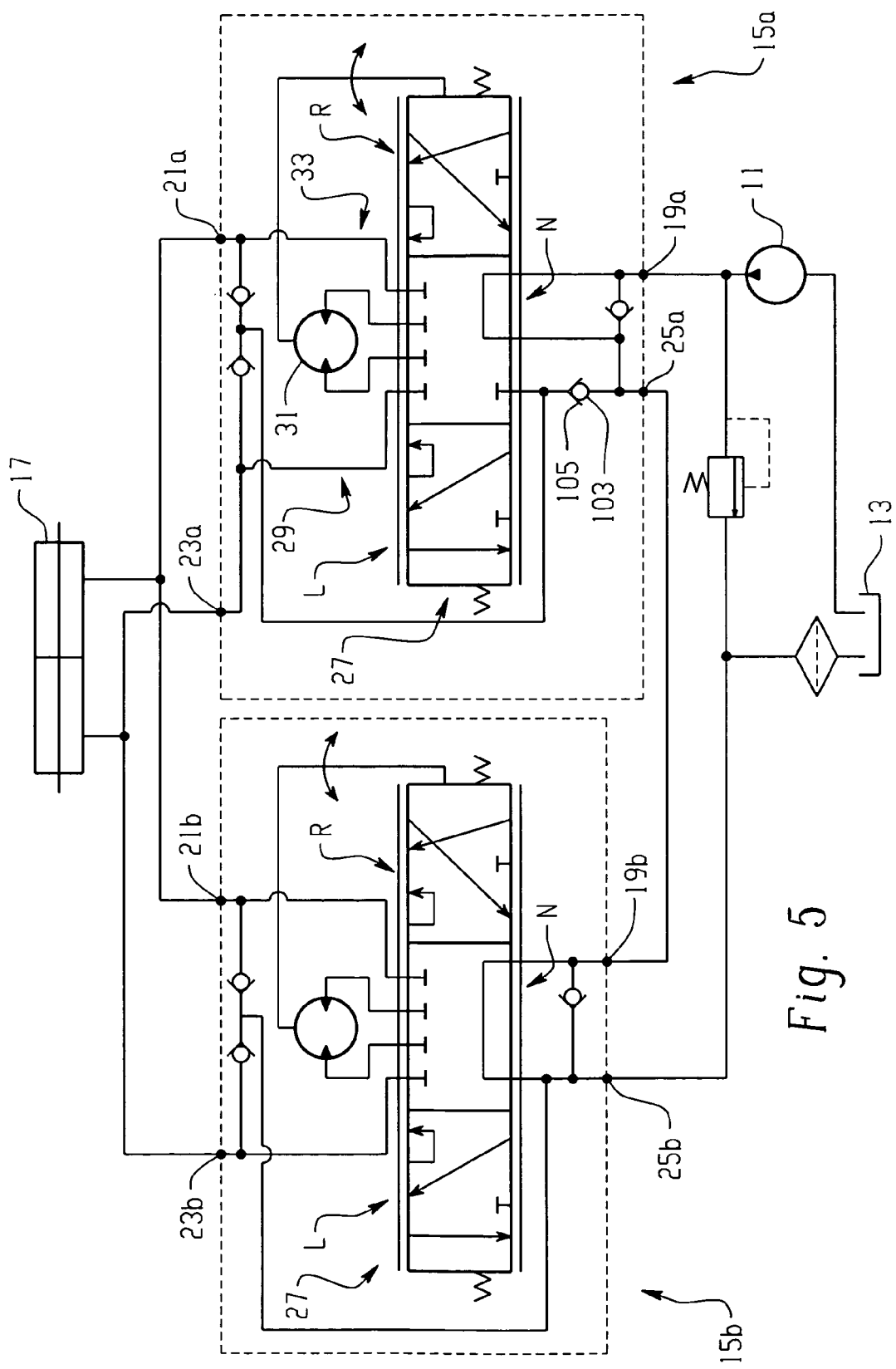
FIG. 5 is a hydraulic schematic of an alternative embodiment of a multiple-input hydrostatic power steering system made in accordance with the present invention.

Referring now to FIG. 5, an alternate embodiment of the multiple-input hydrostatic power steering system is shown, in which the overall system configuration is generally the same as in the first embodiment, but in the FIG. 5 embodiment, the second fluid controller 15b is not substantially identical to the first fluid controller 15a. While there are cost benefits to the first 15a and second 15b fluid controllers being substantially identical, this is not necessary for the proper functioning of the hydrostatic power steering system. Since the return port 25b of the second fluid controller 15b is connected to the system reservoir 13, the fluid pressure in the interior region 114 of the controller valving 27 is limited to the pressure of the system reservoir 13. Therefore, the check valve assembly 101 of the first fluid controller 15a is not necessary in the second fluid controller 15b to avoid a build-up of fluid pressure in the interior region 114 of the controller valving 27. Therefore, as shown schematically in FIG. 5, the second fluid controller 15b could be of the open-center type. As is well known to those skilled in the art of fluid controllers, in an "open-center" controller, when the valving 27 is in the neutral position N, the valving 27 provides direct fluid communication from the inlet port 19b to the return port 25b.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A fluid controller operable to control the flow of fluid from a source of pressurized fluid to a fluid pressure actuated device; said controller being of the type including housing means defining an inlet port for connection to the source of pressurized fluid, a return port for connection to a second fluid controller, and right and left control fluid ports for connection to said fluid pressure actuated device; a valve means disposed in said housing means, said valve means defining a neutral position and left and right operating positions; said valve means and said housing means cooperating to define a left main fluid path and a right main fluid path; in said neutral position, said valve means provides fluid communication from said inlet port to said return port; characterized by:
   (a) one of said valve means and said housing means including a check valve assembly;
   (b) said check valve assembly having a first fluid passage in fluid communication with a second fluid passage and said second fluid passage being in fluid communication with said return port;
   (c) said first fluid passage defining a check valve seat and a check valve operably associated therewith, whereby, in said left and right operating positions, return fluid can flow from said interior region of said valve means, through said first fluid passage, past said check valve, and through said second fluid passage to said return port, and in said neutral position, pressurized fluid can flow from said inlet port to said return port, while being prevented by said check valve from flowing through said first fluid passage and into said interior region of said valve means.

2. A fluid controller as claimed in claim 1, characterized by said check valve assembly having a check valve retainer to limit movement of said check valve.

3. A fluid controller as claimed in claim 1, characterized by said valve means comprising a primary, rotatable valve member, and a cooperating, relatively rotatable follow-up valve member.

4. A fluid controller as claimed in claim 3, characterized by said fluid controller including a fluid meter, including a moveable member operable to measure the volume of fluid flowing through said fluid meter.

5. A fluid controller as claimed in claim 4, characterized by each of said right and left main fluid paths including flow through said fluid meter.

6. A multiple-input hydrostatic power steering system including a source of pressurized fluid, first and second full fluid-linked fluid controllers, and a fluid pressure actuated device; each of said first and second fluid controllers including a housing means defining an inlet port for connection to a source of pressurized fluid, left and right control fluid ports for connection to said fluid pressure actuated device, and a return port; valve means disposed in said housing means and defining a neutral position and right and left operating positions in which said valve means provides fluid communication from said inlet port to said left and right control fluid ports, respectively to define left and right main fluid paths; in said neutral position, said valve means provides fluid communication from said inlet port to said return port; characterized by:

(a) said first and second full fluid linked fluid controllers being substantially identical;

(b) each of said first and second fluid controllers having both said right and left main fluid paths flowing through an interior region of said valve means, then flowing through a first fluid passage defined by said housing means in fluid communication with a second fluid passage defined by said housing means in fluid communication with said return port; and (c) each of said first and second fluid controllers having a check valve assembly with said first fluid passage defining a valve seat and a check valve operably associated therewith, whereby, in said left and right operating positions, return fluid can flow from said interior region of said valve means, through said first fluid passage, past said check valve, and through said second fluid passage to said return port, and in said neutral position, pressurized fluid can flow from said inlet port to said return port; while being prevented by said check valve assembly from flowing through said first fluid passage and into said interior region of said valve means.

7. A multiple-input hydrostatic power steering system as claimed in claim 6, characterized by said valving means comprising a primary, rotatable valve member, and a cooperating, relatively rotatable follow-up valve member.

8. A multiple-input hydrostatic power steering system as claimed in claim 7 characterized by each of said first and second fluid controllers including a fluid meter, including a moveable member operable to measure the volume of fluid flowing through said fluid meter.

9. A multiple-input hydrostatic power steering system as claimed in claim 8, characterized by each of said right and left main fluid paths including flow through said fluid meter.

* * * * *